United States Patent
Zhang et al.

(10) Patent No.: US 10,257,849 B2
(45) Date of Patent: Apr. 9, 2019

(54) METHOD, APPARATUS, AND SYSTEM FOR HANDLING IN-DEVICE COEXISTENCE INTERFERENCE IN A WIRELESS NETWORK

(71) Applicant: Intel IP Corporation, Santa Clara, CA (US)

(72) Inventors: Yujian Zhang, Beijing (CN); Youn Hyoung Heo, Seoul (KR)

(73) Assignee: INTEL IP CORPORATION, Santa Clara, CA (US)

( * ) Notice: Subject to any disclaimer, the term of this patent is extended or adjusted under 35 U.S.C. 154(b) by 244 days.

(21) Appl. No.: 14/128,809

(22) PCT Filed: Sep. 24, 2013

(86) PCT No.: PCT/US2013/061461
§ 371 (c)(1),
(2) Date: Dec. 23, 2013

(87) PCT Pub. No.: WO2014/113080
PCT Pub. Date: Jul. 24, 2014

(65) Prior Publication Data
US 2014/0247759 A1    Sep. 4, 2014

Related U.S. Application Data

(60) Provisional application No. 61/753,914, filed on Jan. 17, 2013.

(51) Int. Cl.
*H04J 1/00*     (2006.01)
*H04W 72/12*    (2009.01)
(Continued)

(52) U.S. Cl.
CPC ...... *H04W 72/1263* (2013.01); *H04B 7/0417* (2013.01); *H04B 7/0456* (2013.01);
(Continued)

(58) Field of Classification Search
CPC ....... H04L 5/0051; H04L 5/0062; H04L 5/14; H04L 5/1469; H04L 63/30; H04L 9/14;
(Continued)

(56) References Cited

U.S. PATENT DOCUMENTS

| 2012/0040620 A1 | 2/2012 | Fu et al. |
| 2012/0275362 A1 | 11/2012 | Park et al. |
| 2014/0092761 A1* | 4/2014 | Behravan ............... H04W 24/02 370/252 |

FOREIGN PATENT DOCUMENTS

| KR | 20120080478 | 7/2012 |
| KR | 20120081923 | 7/2012 |

(Continued)

OTHER PUBLICATIONS

International Preliminary Report on Patentability for PCT Patent Application No. PCT/US2013/061461, dated Jul. 30, 2015, 7 pages.
(Continued)

*Primary Examiner* — Yemane Mesfin
*Assistant Examiner* — Abdelillah Elmejjarmi
(74) *Attorney, Agent, or Firm* — Womble Bond Dickinson (US) LLP

(57) ABSTRACT

A device, method and system of handling in-device coexistence (IDC) interference in a wireless network, may comprise detecting the IDC interference between a first communication module operating over a first protocol and a second communication module operating over a second protocol; generating an IDC indication having a bit string comprising four bits, wherein the four bits correspond to a subframe pattern comprising four subframes, a value of a bit of the bit string indicates whether an enhanced node B (eNB) is requested to abstain from using a subframe of the four subframes of the subframe pattern; and transmit the IDC indication to the eNB via a wireless network.

25 Claims, 4 Drawing Sheets

(51) Int. Cl.

| | | |
|---|---|---|
| *H04W 16/32* | (2009.01) | |
| *H04W 56/00* | (2009.01) | |
| *H04L 5/22* | (2006.01) | |
| *H04J 3/00* | (2006.01) | |
| *H04W 28/02* | (2009.01) | |
| *H04W 76/27* | (2018.01) | |
| *H04W 76/11* | (2018.01) | |
| *H04W 52/02* | (2009.01) | |
| *H04W 12/04* | (2009.01) | |
| *H04W 84/12* | (2009.01) | |
| *H04W 88/06* | (2009.01) | |
| *H04L 5/00* | (2006.01) | |
| *H04W 48/10* | (2009.01) | |
| *H04W 76/28* | (2018.01) | |
| *H04W 76/14* | (2018.01) | |
| *H04B 7/0417* | (2017.01) | |
| *H04B 7/0456* | (2017.01) | |
| *H04L 1/18* | (2006.01) | |
| *H04L 5/14* | (2006.01) | |
| *H04L 9/14* | (2006.01) | |
| *H04L 12/26* | (2006.01) | |
| *H04L 29/06* | (2006.01) | |
| *H04L 29/08* | (2006.01) | |
| *H04W 4/06* | (2009.01) | |
| *H04W 8/00* | (2009.01) | |
| *H04W 36/22* | (2009.01) | |
| *H04W 48/08* | (2009.01) | |
| *H04W 48/20* | (2009.01) | |
| *H04W 68/02* | (2009.01) | |
| *H04W 72/00* | (2009.01) | |
| *H04W 72/02* | (2009.01) | |
| *H04W 72/04* | (2009.01) | |
| *H04W 74/00* | (2009.01) | |
| *H04W 24/02* | (2009.01) | |
| *H04W 24/10* | (2009.01) | |
| *H04W 48/16* | (2009.01) | |
| *H04W 12/02* | (2009.01) | |
| *H04W 36/00* | (2009.01) | |

(52) U.S. Cl.
CPC .............. *H04J 3/00* (2013.01); *H04L 1/1812* (2013.01); *H04L 1/1887* (2013.01); *H04L 5/0051* (2013.01); *H04L 5/0055* (2013.01); *H04L 5/0057* (2013.01); *H04L 5/0062* (2013.01); *H04L 5/0092* (2013.01); *H04L 5/0096* (2013.01); *H04L 5/14* (2013.01); *H04L 5/1469* (2013.01); *H04L 5/22* (2013.01); *H04L 9/14* (2013.01); *H04L 43/08* (2013.01); *H04L 63/0428* (2013.01); *H04L 63/30* (2013.01); *H04L 65/1006* (2013.01); *H04L 65/4076* (2013.01); *H04L 65/602* (2013.01); *H04L 65/608* (2013.01); *H04L 65/80* (2013.01); *H04L 67/02* (2013.01); *H04W 4/06* (2013.01); *H04W 8/005* (2013.01); *H04W 12/02* (2013.01); *H04W 12/04* (2013.01); *H04W 16/32* (2013.01); *H04W 24/02* (2013.01); *H04W 24/10* (2013.01); *H04W 28/0231* (2013.01); *H04W 36/0069* (2018.08); *H04W 36/22* (2013.01); *H04W 48/08* (2013.01); *H04W 48/10* (2013.01); *H04W 48/16* (2013.01); *H04W 48/20* (2013.01); *H04W 52/0251* (2013.01); *H04W 56/001* (2013.01); *H04W 68/02* (2013.01); *H04W 72/00* (2013.01); *H04W 72/02* (2013.01); *H04W 72/042* (2013.01); *H04W 72/046* (2013.01); *H04W 72/0406* (2013.01); *H04W 72/0413* (2013.01); *H04W 72/12* (2013.01); *H04W 72/1205* (2013.01); *H04W 72/1278* (2013.01); *H04W 74/00* (2013.01); *H04W 76/11* (2018.02); *H04W 76/14* (2018.02); *H04W 76/27* (2018.02); *H04W 76/28* (2018.02); *H04W 84/12* (2013.01); *H04W 88/06* (2013.01); *H04L 5/0035* (2013.01); *H04L 5/0094* (2013.01); *H04L 2209/24* (2013.01); *H04L 2209/80* (2013.01); *Y02B 70/32* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/23* (2018.01); *Y02D 70/24* (2018.01); *Y02D 70/25* (2018.01)

(58) Field of Classification Search
CPC .......... H04L 2209/24; H04L 2209/80; H04W 12/04; H04W 24/02; H04W 48/16; H04W 48/20; H04W 52/0251; H04W 76/021; H04W 76/023; H04W 8/005
See application file for complete search history.

(56) References Cited

FOREIGN PATENT DOCUMENTS

| | | | |
|---|---|---|---|
| TW | 201230705 | 7/2012 | |
| TW | 201246821 | 11/2012 | |
| WO | WO-2009/040763 | 4/2009 | |
| WO | WO-2012/044328 | 4/2012 | |
| WO | WO-2012044328 | 4/2012 | |
| WO | WO-2012134178 | 4/2012 | |
| WO | WO-2012/096527 | 7/2012 | |
| WO | WO-2012108733 | 8/2012 | |
| WO | WO-2012/134193 | 10/2012 | |
| WO | WO-2012047001 | 10/2012 | |
| WO | WO2012134178 A2 * | 10/2012 | ............ H04W 36/20 |
| WO | WO-2012134193 | 10/2012 | |

OTHER PUBLICATIONS

Official Letter dated Jun. 12, 2015 (+ English translation). in Taiwan Patent Application No. 103101130, 6 pages.
International Search Report and Written Opinion for PCT Patent Application No. PCT/US2013/061461, dated Jan. 28, 2014, 10 pages.
Notice of Allowance for Taiwanese Application No. 103101130 (+English Translation) dated Dec. 30, 2015, 3 pages.
First Preliminary Rejection (+ English Translation) in Korean Application No. 10-2015-7016030 dated Oct. 14, 2016, 13 pages.
3GPP, "3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331 V11.2.0, (Dec. 2012), pp. 1-340.
Qualcomm Incorporated, "Clarification on IDC-Sub frame Pattern for FDD," 3GPP TSG-RAN WG2 Meeting #80, R2-125330, Nov. 12-16, 2012, New Orleans, US.
Official Communication and Search Report for Taiwanese Application No. 104144491 dated Oct. 20, 2016, 15 pages.
European Search Report for European Application No. 13872068. 5-1908 dated Jul. 19, 2016, 8 pages.

(56) References Cited

OTHER PUBLICATIONS

Search Report for Taiwan Patent Application No. 103101130, dated Jan. 17, 2015, 1 page.
Search Report for Taiwan Patent Application No. 104144491, dated Oct. 18, 2016.

* cited by examiner

METHOD, APPARATUS, AND SYSTEM FOR HANDLING IN-DEVICE COEXISTENCE INTERFERENCE IN A WIRELESS NETWORK

CLAIM OF PRIORITY

This application is a U.S. National Phase application under 35 U.S.C. § 371 of International Application No. PCT/US 13/61461 filed Sep. 24, 2013 entitled "METHOD, APPARATUS AND SYSTEM FOR HANDLING IN-DEVICE COEXISTANCE INTERFERENCE IN A WIRELESS NETWORK" which claims priority to U.S. Provisional Patent Application No. 61/753,914, filed Jan. 17, 2013, the entire contents of which are incorporated herein by reference.

FIELD

Embodiments of the present invention relate generally to the field of communications, and more particularly, to how to handle an in-device coexistence interference in a wireless network.

BACKGROUND INFORMATION

More and more mobile devices, denoted as a user equipment (UE), may be equipped with multiple transceivers operating over various wireless protocols, such as Long Term Evolution (LTE) protocol, WiFi protocol, Bluetooth protocol, Global Navigation Satellite System (GNSS) protocol, and/or others. This way may allow users to access various wireless networks and services ubiquitously. However, it may also introduce in-device coexistence (IDC) interference between those collocated transceivers caused by a small form factor of the UE. For example, if a LTE module receives information at substantially same time period as when a Bluetooth module transmits information, the IDC interference may occur between the LTE module and the Bluetooth module.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for handling in-device coexistence interference in a wireless network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
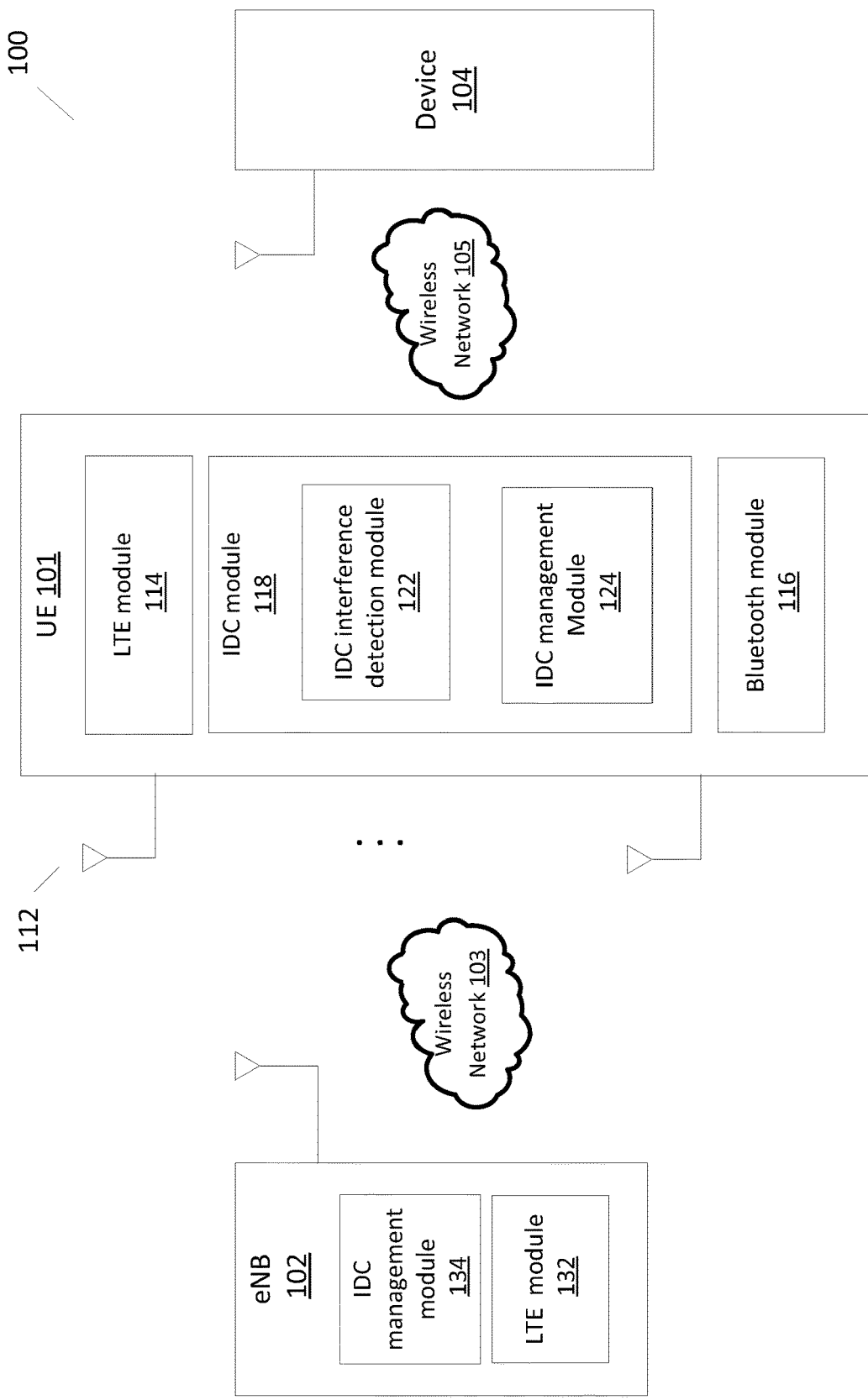
FIG. 1 schematically illustrates a wireless communication system in accordance with various embodiments.

FIG. 1 schematically illustrates a wireless communication system 100 in accordance with various embodiments. Wireless communication system 100 (hereinafter "system 100") may include a UE 101 configured to communicate with other components over various wireless networks, for example, with an eNB 102 over a wireless network 103, and with a device 104 over a wireless network 105. The UE 100 may be embodied as, without limitation, a smart phone, a cellular telephone, a tablet, a consumer electronic device, a laptop computer, a notebook computer, a mobile computing system, a processor-based system, and/or any other mobile communication device configured to detect and handle the IDC interference with network intervention.

In various embodiments, the UE 101 may comprise a plurality of antennas 112, a LTE module 114, a Bluetooth module 116, an IDC module 118 and/or others. The LTE module 114 of the UE 101 may receive or transmit information from or to the eNB 102 over the wireless network 103 operating in conformance with frequency division duplexing (FDD) configuration of a third generation partnership project (3GPP) LTE, such as an evolved universal terrestrial radio access network (E-UTRAN). The Bluetooth module 116 of the UE 101 may receive or transmit information from or to the device 104 over the wireless network 105 (e.g. a piconet) operating in conformance with a Bluetooth specification of the Bluetooth Special Interest Group (SIG) standards. Although FIG. 1 illustrates the LTE module 114 and the Bluetooth module 116, the UE 101 may include additional or fewer transceiver modules communicating under other protocols, such as a WiFi transceiver, a GNSS transceiver, etc.

In various embodiments, the IDC module 118 may detect and manage the IDC interference between two transceivers of the UE 101 (e.g., the LTE module 114 and the Bluetooth module 116). The IDC module 118 may further comprise an IDC interference detection module 122 and an IDC management module 124. The IDC interference detection module 122 may detect whether the IDC interference exists between the two transceivers. Because of a small form factor of the UE 101, the two transceivers may operate simultaneously in an adjacent band, for example, the LTE module 114 receiving information in substantively same time period when the Bluetooth module 116 transmitting information in the adjacent band. As a result, the LTE module 114 may cause the IDC interference to or get interfered by the Bluetooth module 116.

In various embodiments, the IDC management module 124 may determine whether the IDC interference can be solved by the UE 101 itself or not. Based on a determination that the IDC interference can be solved by the UE 101 itself, the IDC management module 124 may work with the transceivers, such as the LTE module 114 or the Bluetooth module 116, to solve the IDC interference. For example, based on information from the IDC management module 124, the Bluetooth module 116 may change its Bluetooth configurations, such as a Bluetooth frame timing, a transmission and reception pair, and/or others, to solve the IDC interference problem. However, if the IDC interference cannot be solved by the UE itself and a network intervening may be desired, the IDC management module 124 may generate an IDC indication to be sent to the eNB 102, in order to report the problem and provide information that may assist the eNB 102 to resolve the problem.

In various embodiments, the IDC indication may indicate a subframe pattern list having one or more subframe patterns. An example of the IDC indication may comprise one or more bit strings, with individual bit strings corresponding to individual subframe patterns. A bit string may have a size of four bits with individual bits corresponding to individual subframes in the subframe pattern. Here, a subframe may have a duration of 1 ms under the LTE FDD specification and 10 subframes may compose one LTE frame. In various embodiments, the subframe pattern may comprise four consecutive subframes.

The IDC indication may indicate which subframe of the subframe pattern the eNB 102 may be requested to abstain from using. For example, a value (e.g., value "0" or value "1") for a bit of the bit string may indicate whether the eNB 102 may be requested to abstain from using the subframe corresponding to the bit. The value (e.g., value "0" or value "1") for the bit may further indicate whether the eNB 102 may be requested to abstain from using a hybrid automatic repeat request (HARQ) process related to the subframe.

In various embodiments, the HARQ process may be used to reliably communicate data from one node to another node. The HARQ process may use a stop and wait protocol. For example, a transmitting entity (e.g., the UE 101) may transmit a data block to a receiving entity (e.g., the eNB 102). The transmitting entity may stop and wait until it receives an acknowledgement (ACK) or a negative acknowledgement (NACK) from the receiving entity. If the transmitting entity receives an ACK, then the next data block may be transmitted. However, if the transmitting entity receives a NACK, then the same data block may be retransmitted. Generally, LTE FDD may use multiple HARQ parallel processes offset in time with each other.

Based on the LTE FDD, a HARQ timing may be 8 subframes. For example, if a physical downlink shared channel carrying data is transmitted from the eNB 102 to the UE 101 in subframe n, then a HARQ ACK/NACK may be transmitted from the UE 101 to the eNB 102 in subframe n+4. Similarly, if the eNB 102 sends a physical downlink control channel (PDCCH) carrying an uplink grant to the UE 101 in subframe n, then a corresponding physical uplink shared channel carrying data may be transmitted from the UE 101 to the eNB 102 in subframe n+4, a HARQ ACK/NACK may be transmitted from the eNB 102 to the UE 101 in subframe n+8, and based on the ACK/NACK response, a new data or an uplink HARQ retransmission may be sent from the UE 101 to the eNB 102 in subframe n+12 and so on.

Based on the above HARQ timing relationship, if a value for a bit is set to 0 (or 1) which indicates a subframe n corresponding to the bit is abstained from using, then the subframes n+4k (k=1, 2, 3 . . . ) may be set to 0 (or 1). For example, if the subframe n carrying the uplink grant is set to 0 (or 1), then the subframe n+4 carrying the data, the subframe n+8 carrying the HARQ ACK/NACK, and the subframe n+12 carrying the HARQ retransmission may be set to 0 (or 1), as well. Since length of the subframe pattern in LTE FDD is changed to 4 subframes, the HARQ timing relationship may be satisfied.

In various embodiments, for the LTE FDD, the subframe pattern indicated in the IDC indication may start from a first subframe of a LTE frame satisfying that SFN mod 2=0, wherein SFN may stand for system frame number and one LTE frame may be composed of 10 subframes. However, it should be understood that other standards may be set for the starting subframe of the subframe pattern. For example, the starting subframe may be set as the first subframe of the LTE frame satisfying that SFN mod 2=1. For another example, the starting subframe may be set as the first subframe of the LTE frame satisfying that SFN mod n=0 or SFN mod n=1, in which n is other even number. Considering that a subframe pattern has 4 subframes and a LTE frame has 10 subframes, a common multiple of 4 and 10 is 20, 40, 60 . . . , the above technology for the starting subframe may help to guarantee the HARQ timing relationship.

In various embodiments, the UE 101 may generate a radio resource control signaling carrying the IDC indication to be sent to the eNB 102. Besides the subframe pattern, in some embodiments, the IDC indication may comprise other information useful for the eNB 102 to solve the IDC interference, such as an affected carrier frequency list or others. The LTE module 114 may transmit the IDC indication to the eNB 102.

In various embodiments, the eNB 102 may generate DRX configuration information based on the IDC indication, and send the DRX configuration information to the UE 101. The DRX configuration information may indicate a DRX pattern related to different communication protocol scenarios, such as the LTE and Bluetooth protocol scenarios. For example, the DRX configuration information may comprise, without limitation, DRX cycle parameters such as a long DRX cycle start offset, a short DRX Cycle, a DRX inactivity timer value, a DRX retransmission timer value, and/or others.

In various embodiments, the LTE module 114 of UE 101 may configure its LTE elements and operate based on the DRX configuration information received from the eNB 102. When needed, under the management from the IDC module 118, the Bluetooth module 116 may further configure its Bluetooth elements and operate based on the DRX configuration information. By this way, the LTE module 122 may avoid transmit information at substantially the same time as the WiFi module 124, so as to solve the IDC interference.

In various embodiments, the eNB 102 may comprise a LTE module 132 and an IDC management module 134. The LTE module 152 may receive or transmit information from or to the UE 101 as well as other devices in the wireless network 103. For example, the LTE module 132 may receive the IDC indication from the UE 101. When the eNB 102 agrees with the subframe pattern as indicated in the IDC indication, the IDC management module 134 of eNB 102 may generate the DRX configuration information based on the IDC indication. In other cases, the eNB 102 may revise the subframe pattern indicated by the IDC indication and generate the DRX configuration information accordingly. For the IDC indication having more than one subframe patterns, the eNB 102 may select one of the subframe patterns and generate the DRX configuration as described in the above.

Based on the DRX configuration information, the UE 101 and eNB 102 can seamlessly communicate via the wireless network 103 without interfering or being interfered by other wireless networks, e.g., the wireless network 105.

Figure 2:
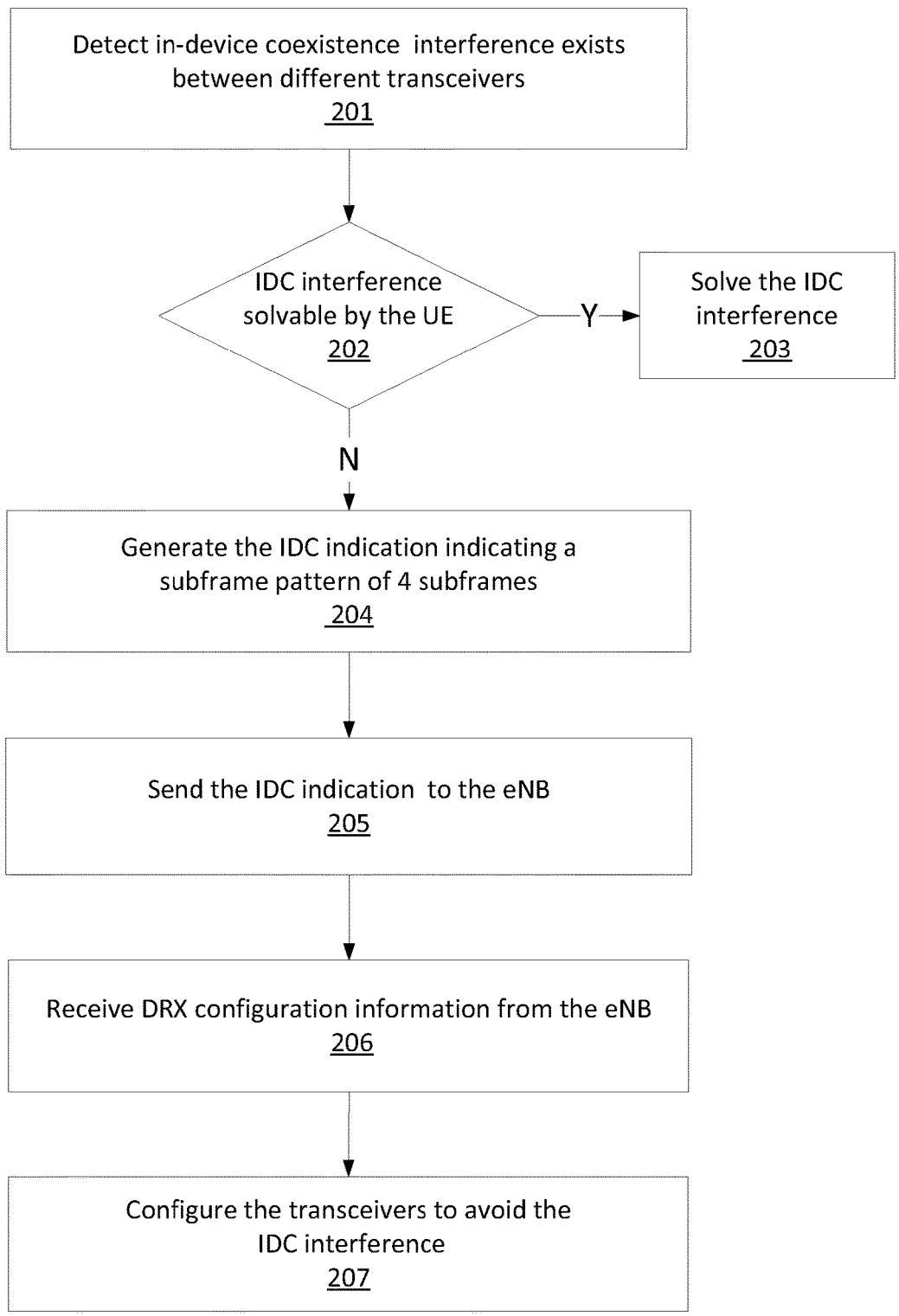
FIG. 2 schematically illustrates a method of handling IDC interference, employed by a UE in accordance with various embodiments.

FIG. 2 schematically illustrates a method of handling IDC interference, employed by the UE 101 in accordance with various embodiments.

In various embodiments, the IDC interference detection module 122 or other device of the UE 101 may detect that the IDC interference exists between two transceivers operating under two communication protocols, such as the LTE module 114 and the Bluetooth module 116, at block 201. Then, at block 202, the IDC management module 124 or other devices of the UE 101 may determine whether the IDC interference can be solved by the UE itself. In response that the IDC interference can be solved by the UE 101, the IDC management module 124 may work with the LTE module 114 and/or the Bluetooth module 116 to solve the IDC interference at block 203. For example, the Bluetooth module 116 may change its Bluetooth configurations, such as a Bluetooth frame timing, a transmission and reception pair, and/or others, to solve the IDC interference problem.

However, in response that the IDC interference cannot be solved by the UE, the IDC management module 124 or other devices may generate the IDC indication to indicate the one or more subframe patterns at block 204. In various embodiments, the IDC indication may comprise the one or more bit strings, with individual bit strings corresponding to individual subframe patterns. The subframe pattern may comprise four consecutive subframes, and the bit string may comprise four bits with individual bits corresponding to individual subframes in the subframe pattern. The IDC indication may indicate which subframe of the subframe pattern the eNB 102 may be requested to abstain from using. For example, the value (e.g., value "0" or "1") for the bit of the bit string may indicate whether the eNB 102 may be requested to abstain from using the subframe corresponding to the bit. The value (e.g., value "0" or "1") for the bit may further indicate whether the eNB 102 may be requested to abstain from using the HARQ process related to the subframe.

In various embodiments, the subframe pattern indicated in the IDC indication may start from the first subframe of the LTE frame satisfying that SFN mod 2=0. However, it should be understood that other standards may be set for the starting subframe of the subframe pattern. For example, the starting subframe may be set as the first subframe of the LTE frame satisfying that SFN mod 2=1. For another example, the starting subframe may be set as the first subframe of the LTE frame satisfying that SFN mod n=0 or SFN mod n=1, in which n is other even number.

At block 205, the LTE module 114 may transmit the IDC indication to the eNB 102 via the wireless network 103 supporting the LTE FDD specification. Based on the DRX configuration information received from the eNB 102 at block 206, under the management from the IDC module 118, the LTE module 114 and/or the Bluetooth module 116 may configure its LTE and/or Bluetooth elements at block 207, in order to avoid the IDC interference between them.

Figure 3:
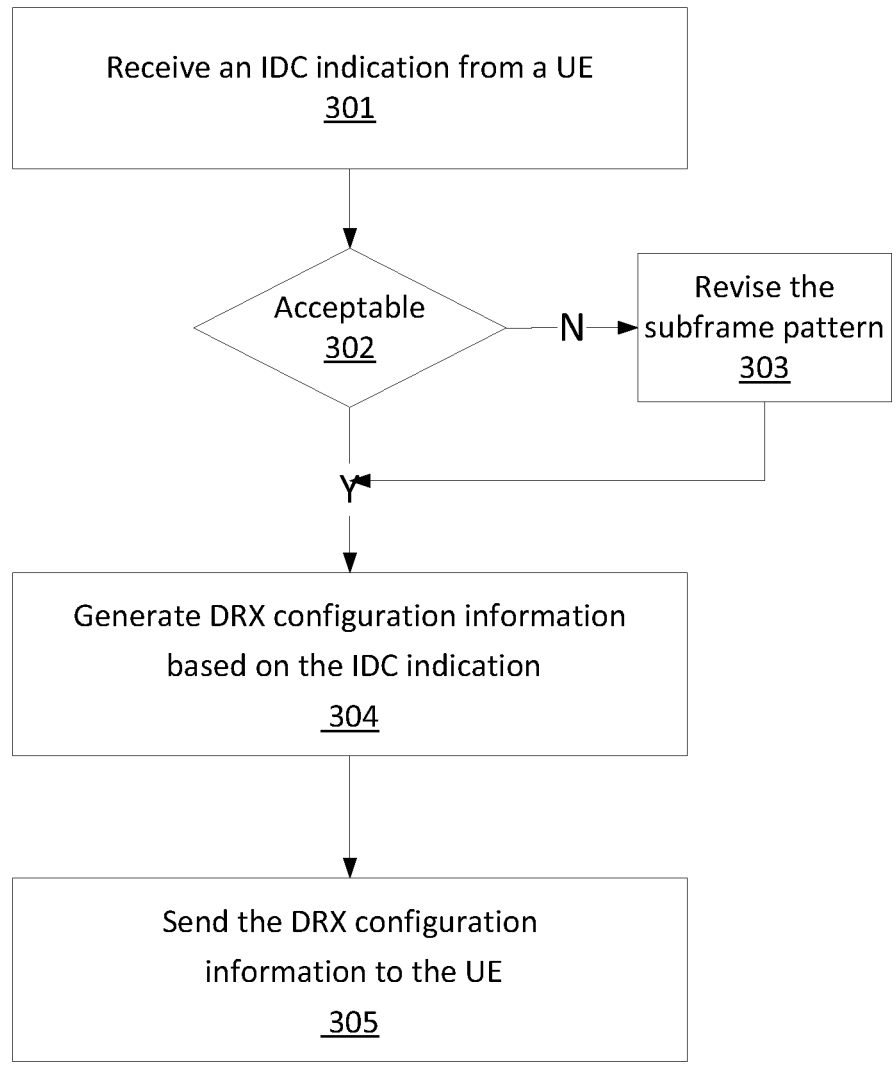
FIG. 3 schematically illustrates a method of handling the IDC interference, employed by an enhanced Node B (eNB) in accordance with various embodiments.

FIG. 3 schematically illustrates a method of handling the IDC interference, employed by the eNB 102 in accordance with various embodiments. In various embodiments, the LTE module 132 or other device of the eNB 102 may receive the IDC indication from the UE 101 at block 301. Then, at block 302, the IDC management module 134 or other device of the eNB 102 may determine whether the subframe pattern indicated by the IDC indication is acceptable. In response that the subframe pattern is acceptable, the IDC management module 134 or other device of the eNB 102 may generate the DRX configuration information based on the subframe pattern at block 304. In other cases, the eNB 102 may revise the subframe pattern at block 303 before generating the DRX configuration information accordingly. For the IDC indication having more than one subframe patterns, the eNB 102 may select one of the subframe patterns and generate the DRX configuration as described in the above.

The DRX configuration information may indicate the DRX pattern related to different communication protocol scenarios, such as the LTE and Bluetooth protocol scenarios. For example, the DRX configuration information may comprise, without limitation, DRX cycle parameters such as a long DRX cycle start offset, a short DRX Cycle, a DRX inactivity timer value, a DRX retransmission timer value, and/or others.

At block 305, the LTE module 132 of the eNB 102 may send the DRX configuration information to the UE 101, which utilizes the DRX configuration information to configure the transceivers, e.g., the LTE module 114 and/or the Bluetooth module 116, in order to avoid the IDC interference between them.

Figure 4:
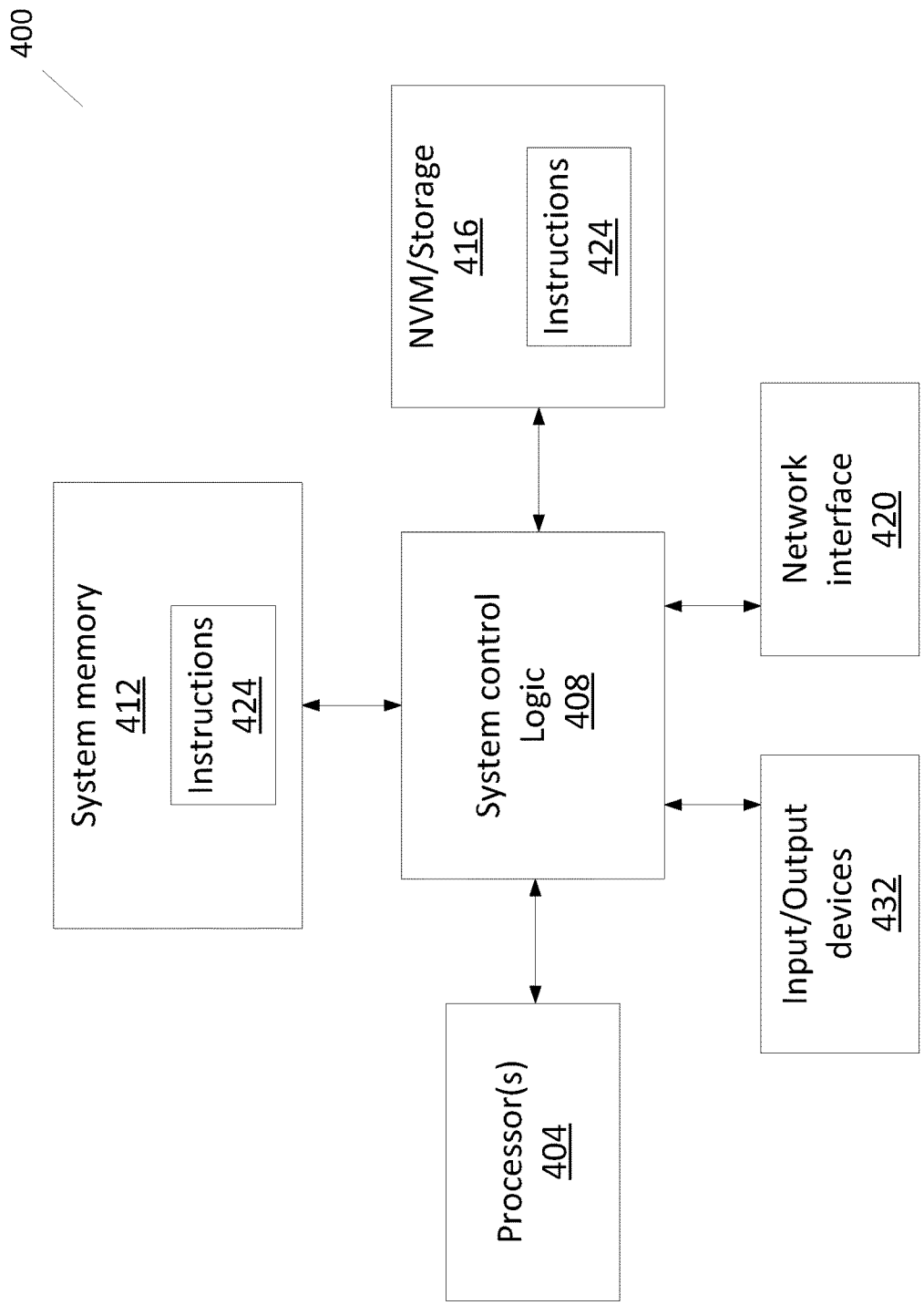
FIG. 4 schematically illustrates an example system in accordance with various embodiments.

FIG. 4 schematically illustrates an example system 400 in accordance with various embodiments. The system 400 may comprise one or more processor(s) 404, system control logic 408 coupled with at least one of the processor(s) 404, system memory 412 coupled with system control logic 408, non-volatile memory (NVM)/storage 416 coupled with system control logic 408, and a network interface 420 coupled with system control logic 408.

Processor(s) 404 may include one or more single-core or multi-core processors. Processor(s) 404 may include any combination of general-purpose processors and dedicated processors (e.g., graphics processors, application processors, baseband processors, etc.). In an embodiment in which the system 400 implements UE 101, processors(s) 404 may be configured to execute the embodiments of FIGS. 1 and 2 in accordance with various embodiments. In an embodiment in which the system 400 implements eNB 102, processor(s) 404 may be configured to execute embodiments of FIGS. 1 and 3.

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory (DRAM), for example.

NVM/storage 416 may include one or more tangible, non-transitory computer-readable media used to store data and/or instructions, for example. NVM/storage 416 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 416 may include a storage resource physically part of a device on which the system 400 is installed or it may be accessible by, but not necessarily a part of, the device. For example, the NVM/storage 416 may be accessed over a network via the network interface 420.

System memory 412 and NVM/storage 416 may respectively include, in particular, temporal and persistent copies of instructions 424. Instructions 424 may include instructions that when executed by at least one of the processor(s) 404 result in the system 400 implementing a one or both of methods as described with reference to FIGS. 2 and 3. In various embodiments, instructions 424, or hardware, firmware, and/or software components thereof, may additionally/alternatively be located in the system control logic 408, the network interface 420, and/or the processor(s) 404.

Network interface 420 may have a transceiver (e.g., the LTE module 114 or Bluetooth module 116 in FIG. 1) to provide a radio interface for system 400 to communicate over one or more network(s) and/or with any other suitable device. In various embodiments, the LTE module 114 or the Bluetooth module 116 may be integrated with other components of system 400. For example, the LTE module 114 or the Bluetooth module 116 may include a processor of the processor(s) 404, memory of the system memory 412, and NVM/Storage of NVM/Storage 416. Network interface 420 may include any suitable hardware and/or firmware. Network interface 420 may include a plurality of antennas (e.g., the antennas 112 in FIG. 1) to provide a multiple input, multiple output radio interface. Network interface 420 for one embodiment may include, for example, a network adapter, a wireless network adapter, a telephone modem, and/or a wireless modem.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

The system 400 may further include input/output (I/O) devices 432. The I/O devices 432 may include user interfaces designed to enable user interaction with the system 400, peripheral component interfaces designed to enable peripheral component interaction with the system 400, and/or sensors designed to determine environmental conditions and/or location information related to the system 400.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 420 to communicate with components of a positioning network, e.g., a global positioning system (GPS) satellite.

In various embodiments, the system 400 may be a mobile computing device such as, but not limited to, a laptop computing device, a tablet computing device, a netbook, a mobile phone, etc. In various embodiments, system 400 may have more or less components, and/or different architectures.

The disclosure may include various example embodiments disclosed below. In example embodiment 1, a method employed by a user equipment (UE) may comprise: detecting an in-device coexistence (IDC) interference between a first communication module operating over a first protocol and a second communication module operating over a second protocol; generating an IDC indication having a bit string comprising four bits, wherein the four bits correspond to a subframe pattern comprising four subframes, a value of a bit of the bit string indicates whether an enhanced node B (eNB) is requested to abstain from using a subframe of the four subframes of the subframe pattern; and transmit the IDC indication to the eNB via a wireless network.

In example embodiment 2, the IDC indication according to the example embodiment 1 may be generated in response to a determination that the IDC interference cannot be solved by the UE and a network intervention is desired.

In example embodiment 3, the value of the bit according to any of the example embodiments 1-2 may further indicate whether the eNB is requested to abstain from using one or more subsequent subframes that satisfy a hybrid automatic repeat request (HARQ) relationship with the subframe.

In example embodiment 4, the IDC indication according to any of the example embodiments 1-3 may be generated by defining that the subframe pattern starts with a radio frame satisfying that system frame number (SFN) mod 2=0.

In example embodiment 5, the IDC indication according to any of the example embodiments 1-4 may be generated by defining that the subframe pattern starts with a radio frame satisfying that system frame number (SFN) mod 2=1.

In example embodiment 6, the method according to any of the example embodiments 1-5 may further comprises receiving a discontinuous reception (DRX) configuration information from the eNB, which is generated based on the IDC indication; and controlling a DRX operation based on the DRX configuration information to solve the IDC interference.

In example embodiment 7, the UE according to any of the example embodiments 1-6 may be a mobile device having a touchscreen.

In example embodiment 8, the wireless network according to any of the example embodiments 1-7 may comply with a long-term evolution (LTE) frequency division duplexing (FDD) specification.

In example embodiment 9, a method employed by an enhanced node B (eNB) may comprise: receiving an in-device coexistence (IDC) indication from a user equipment (UE), wherein the IDC indication having a bit string comprising four bits, wherein the bit string corresponds to a subframe pattern comprising four subframes, and a value of a bit of the bit string indicates whether the eNB is requested to abstain from using a subframe of the four subframes of the subframe pattern; generating a discontinuous reception (DRX) configuration information based on the IDC indication, in response to a determination that the subframe pattern is acceptable; and transmitting the DRX configuration information to the UE over a wireless network.

In example embodiment 10, the value of the bit according to the example embodiment 9 may further indicate whether the eNB is requested to abstain from using one or more subsequent subframes that satisfy a hybrid automatic repeat request (HARQ) relationship with the subframe.

In example embodiment 11, the IDC indication according to any of the example embodiments 9-10 may be generated by defining that the subframe pattern starts with a radio frame satisfying that system frame number (SFN) mod 2=0.

In example embodiment 12, the IDC indication according to any of the example embodiments 9-11 may be generated by defining that the subframe pattern starts from a radio frame satisfying that system frame number (SFN) mod 2=1.

In example embodiment 13, the wireless network according to any of the example embodiments 9-12 may comply with a long-term evolution (LTE) frequency division duplexing (FDD) specification.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method for handling in-device coexistence (IDC) interference in a user equipment (UE) in wireless communication, comprising:
   detecting by the UE an IDC interference between a first communication module of the UE operating according to a first communication protocol and a second communication module of the UE operating according to a second communication protocol;
   in response to the detection of the IDC interference, generating by the UE an IDC indication comprising a bit string consisting of four bits, wherein each bit of the four bits of the bit string relates to a respective subframe n and subsequent subframes n+4k of a subframe pattern, wherein k is an integer number greater than 0, wherein the subsequent subframes n+4k satisfy a hybrid automatic repeat request (HARQ) timing relationship with the respective subframe n, and wherein a value of each bit of the bit string indicates whether an evolved node B (eNB) is requested to abstain from using the respective subframe n and subsequent subframes n+4k of the subframe pattern in a wireless transmission from the eNB to the UE,
   wherein generating, by the UE, the IDC indication comprising the bit string consisting of four bits includes setting a starting subframe of the subframe pattern to guarantee the hybrid automatic repeat request (HARQ) timing relationship between the UE and the eNB; and
   transmitting by the UE the IDC indication to the eNB via a wireless communication network.

2. The method of claim 1, wherein the IDC indication is generated by defining that the subframe pattern starts with a radio frame with a system frame number (SFN) satisfying a condition that SFN modulo 2 equals 0, SFN mod 2=0.

3. The method of claim 1, wherein the IDC indication is generated by defining that the subframe pattern starts with a radio frame with a system frame number (SFN) satisfying a condition that SFN modulo 2 equals 1, SFN mod 2=1.

4. The method of claim 1, further comprising:
   receiving at the UE a discontinuous reception (DRX) configuration information from the eNB, the DRX configuration information being generated based on the IDC indication; and
   controlling a DRX operation based on the DRX configuration information to solve the IDC interference.

5. The method of claim 1, wherein the first communication module operates according to a long-term evolution (LTE) frequency division duplexing (FDD) specification and the second communication module operates according to a Bluetooth or a Wi-Fi specification.

6. An apparatus to be employed by a user equipment (UE) for handling in-device coexistence interference in wireless communication, the apparatus comprising:
   an in-device coexistence (IDC) interference detection module including circuitry to detect an IDC interference between a first communication module of the UE operating according to a first communication protocol and a second communication module of the UE operating according to a second communication protocol; and an IDC management module including circuitry to generate an IDC indication comprising a bit string consisting of four bits, wherein each bit of the four bits of the bit string relates to a respective subframe n and subsequent subframes n+4k of a subframe pattern, wherein k is an integer number greater than 0, wherein the subsequent subframes n+4k satisfy a hybrid automatic repeat request (HARQ) timing relationship with the respective subframe n, and
   wherein a value of each bit of the bit string indicates whether an evolved node B (eNB) is requested to abstain from using the respective subframe n and subsequent subframes n+4k of the subframe pattern in a wireless transmission from the eNB to the UE,
   wherein the IDC management module is operable to generate the IDC indication comprising the bit string consisting of four bits by setting a starting subframe of the subframe pattern to guarantee a-the hybrid automatic repeat request (HARQ) timing relationship between the UE and the eNB, and
   wherein the UE is to transmit the IDC indication to the eNB via a wireless communication network.

7. The apparatus of claim 6, further comprising: the first communication module operating in compliance with a long-term evolution (LTE) frequency division duplexing (FDD) specification and the second communication module operating in compliance with a Bluetooth or a Wi-Fi specification.

8. The apparatus of claim 6, wherein the first communication module is further to transmit the IDC indication to the eNB via a wireless communication network.

9. The apparatus of claim 6, wherein the IDC indication is generated by defining that the subframe pattern starts with a radio frame with a system frame number (SFN) satisfying a condition that SFN modulo 2 equals 0, SFN mod 2=0.

10. The apparatus of claim 6, wherein the IDC indication is generated by defining that the subframe pattern starts with a radio frame with a system frame number (SFN) satisfying a condition that SFN modulo 2 equals 1, SFN mod 2=1.

11. The apparatus of claim 6, wherein:
the first communication module is further to receive a discontinuous reception (DRX) configuration information from the eNB, the DRX configuration information being generated based on the IDC indication; and
the IDC management module is further to control a DRX operation based on the DRX configuration information to solve the IDC interference.

12. An apparatus, comprising: one or more processors; and one or more non-transitory computer-readable media having instructions stored there on that, when being executed by the one or more processors, cause the apparatus to:
detect, with an in-device coexistence (IDC) interference detection module of a user equipment (UE), an IDC interference between a first communication module of the UE operating according to a first communication protocol and a second communication module of the UE operating according to a second communication protocol;
in response to the detection of the IDC interference, generate with an IDC management module of the UE an IDC indication having a bit string consisting of four bits, wherein each bit of the four bits of the bit string relates to a respective subframe n and subsequent subframes n+4k of a subframe pattern, wherein k is an integer number greater than 0, wherein the subsequent subframes n+4k satisfy a hybrid automatic repeat request (HARQ) timing relationship with the respective subframe n, and wherein a value of each bit of the bit string indicates whether an evolved node B (eNB) is requested to abstain from using the respective subframe and subsequent subframes n+4k of the subframe pattern in a wireless transmission from the eNB to the UE, wherein the IDC indication is generated, in part, by setting a starting subframe of the subframe pattern to guarantee the hybrid automatic repeat request (HARQ) timing relationship between the UE and the eNB; and
transmitting by the UE the IDC indication to the eNB via a wireless communication network.

13. The apparatus of claim 12, wherein the IDC indication is generated by defining that the subframe pattern starts with a radio frame with a system frame number (SFN) satisfying a condition that SFN modulo 2 equals 0, SFN mod 2=0.

14. The apparatus of claim 12, wherein the IDC indication is generated by defining that the subframe pattern starts with a radio frame with a system frame number (SFN) satisfying a condition that SFN modulo 2 equals 1, SFN mod 2=1.

15. The apparatus of claim 12, wherein the instructions further result in the system:
receiving at the UE a discontinuous reception (DRX) configuration information from the eNB, the DRX configuration information being generated based on the IDC indication; and
controlling a DRX operation based on the DRX configuration information to solve the IDC interference.

16. The apparatus of claim 12, wherein the apparatus is a mobile device having a touchscreen.

17. The apparatus of claim 12, wherein the wireless communication network complies with a long-term evolution (LTE) frequency division duplexing (FDD) specification.

18. A method, comprising: receiving at an evolved node B (eNB) an in-device coexistence (IDC) indication from a user equipment (UE), the IDC indication being generated in response to detection of IDC interference between a first communication module of the UE operating according to a first communication protocol and a second communication module of the UE operating according to a second communication protocol, wherein the IDC indication comprising a bit string consisting of four bits, wherein each bit of the four bits of the bit string relates to a respective subframe n and subsequent subframes n+4k of a subframe pattern, wherein k is an integer number greater than 0, wherein the subsequent subframes n+4k satisfy a hybrid automatic repeat request (HARQ) timing relationship with the respective subframe n, and wherein a value of each bit of the bit string indicates whether the eNB is requested to abstain from using the respective subframe n and subsequent subframes n+4k of the subframe pattern in a wireless transmission from the eNB to the UE, wherein the IDC indication is generated by setting a starting subframe of the subframe pattern to guarantee the hybrid automatic repeat request (HARQ) timing relationship between the UE and the eNB;
generating a discontinuous reception (DRX) configuration information based on the IDC indication, in response to a determination that the subframe pattern is acceptable; and
transmitting the DRX configuration information to the UE over the wireless communication network.

19. The method of claim 18, wherein the IDC indication is generated by defining that the subframe pattern starts with a radio frame with a system frame number (SFN) satisfying a condition that SFN modulo 2 equals 0, SFN mod 2=0.

20. The method of claim 18, wherein the IDC indication is generated by defining that the subframe pattern starts from a radio frame with a system frame number (SFN) satisfying a condition that SFN modulo 2 equals 1, SFN mod 2=1.

21. The method of claim 18, wherein the wireless communication network complies with a long-term evolution (LTE) frequency division duplexing (FDD) specification.

22. An apparatus, comprising: an evolved node B (eNB) including: a communication module to receive an in-device coexistence (IDC) indication from a user equipment (UE), the IDC indication being generated in response to detection of IDC interference between a first communication module of the UE operating according to a first communication protocol and a second communication module of the UE operating according to a second communication protocol, wherein the IDC indication comprising a bit string consisting of four bits, wherein each bit of the four bits of the bit string relates to a respective subframe n and subsequent subframes n+4k of a subframe pattern, wherein k is an integer number greater than 0, wherein the subsequent subframes n+4k satisfy a hybrid automatic repeat request (HARQ) timing relationship with the respective subframe n, and wherein a value of each bit of the bit string indicates whether the eNB is requested to abstain from using the respective subframe n and subsequent subframes n+4k of the subframe pattern in a wireless transmission from the eNB to the UE, wherein the IDC indication is generated by setting a starting subframe of the subframe pattern to guarantee the hybrid automatic repeat request (HARQ) timing relationship between the UE and the eNB, and
- an IDC management module including circuitry to generate a discontinuous reception (DRX) configuration information based on the IDC indication, in response to a determination that the subframe pattern is acceptable;
- wherein the communication module is further to transmit the DRX configuration information to the UE over the wireless communication network.

23. The apparatus of claim 22, wherein the IDC indication is generated by defining that the subframe pattern starts with a radio frame with a system frame number (SFN) satisfying a condition that SFN modulo 2 equals 0, SFN mod 2=0.

24. The apparatus of claim 22, wherein the IDC indication is generated by defining that the subframe pattern starts from a radio frame with a system frame number (SFN) satisfying a condition that SFN modulo 2 equals 1, SFN mod 2=1.

25. The apparatus of claim 22 wherein the wireless communication network complies with a long-term evolution (LTE) frequency division duplexing (FDD) specification.

* * * * *